(12) United States Patent
Stocker et al.

(10) Patent No.: US 7,894,949 B2
(45) Date of Patent: Feb. 22, 2011

(54) FAULT TRACING IN THE DATA BUS SYSTEM OF A VEHICLE

(75) Inventors: Konrad Stocker, Ergoldsbach (DE); Florian Kuttig, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 33 days.

(21) Appl. No.: 12/434,193

(22) Filed: May 1, 2009

(65) Prior Publication Data

US 2009/0271665 A1 Oct. 29, 2009

Related U.S. Application Data

(63) Continuation of application No. PCT/EP2006/010547, filed on Nov. 3, 2006.

(51) Int. Cl.
- G01M 17/00 (2006.01)
- G06F 7/00 (2006.01)
- G06F 19/00 (2006.01)

(52) U.S. Cl. .............. 701/29; 701/1; 701/33; 702/183; 702/185; 710/100; 710/110; 714/48; 340/438; 340/500; 340/514

(58) Field of Classification Search .......... 701/1, 701/29, 48, 102, 114, 33; 714/48; 710/100, 710/104, 110; 340/438, 500, 514; 702/183, 702/184, 187, 185
See application file for complete search history.

(56) References Cited

U.S. PATENT DOCUMENTS

| | | | |
|---|---|---|---|
| 4,410,938 A * | 10/1983 | Higashiyama | ............... 714/47 |
| 5,541,840 A * | 7/1996 | Gurne et al. | .................. 701/33 |
| 5,670,939 A * | 9/1997 | Rodewald et al. | ........... 340/514 |
| 6,393,379 B1 * | 5/2002 | Gumbel | ...................... 702/183 |
| 6,871,250 B2 | 3/2005 | Froeschl et al. | |
| 2002/0116103 A1 * | 8/2002 | Matsunaga et al. | ............ 701/29 |
| 2004/0003153 A1 * | 1/2004 | Froeschl et al. | ............. 710/104 |
| 2004/0073791 A1 * | 4/2004 | Vollmer et al. | .............. 713/168 |

FOREIGN PATENT DOCUMENTS

| | | |
|---|---|---|
| DE | 102 54 393 A1 | 5/2004 |
| WO | WO 02/37923 A2 | 5/2002 |

OTHER PUBLICATIONS

International Search report dated Feb. 9, 2007 (two (2) pages).

* cited by examiner

*Primary Examiner*—Khoi Tran
*Assistant Examiner*—Jaime Figueroa
(74) *Attorney, Agent, or Firm*—Crowell & Moring LLP

(57) ABSTRACT

A data bus system of a motor vehicle includes at least one first and one second control device which communicates with each another via at least one data bus. In order to be able to localize errors more easily, the system has at least one identification device which provides an identifier to each of the messages sent by the first and the second control device. The first control device receives a first message, and the identification device causes the first control device to provide the message sent therefrom with a first identifier. The second control device receives the message sent by the first control device with the first identifier, and the identification device causes the second control device to provide the message sent therefrom with a second identifier.

16 Claims, 1 Drawing Sheet

FAULT TRACING IN THE DATA BUS SYSTEM OF A VEHICLE

CROSS-REFERENCE TO RELATED APPLICATIONS

This application is a continuation of PCT International Application No. PCT/EP2006/010547, filed Nov. 3, 2006, the entire disclosure of which is herein expressly incorporated by reference.

BACKGROUND AND SUMMARY OF THE INVENTION

The invention relates in particular to a data bus system of a motor vehicle having at least a first and a second control device which communicate with one another by way of at least one data bus.

Today's fault reporting concepts are based on so-called diagnostic trouble codes (DTC) which, in the event of trouble, are set as a fault message in a program-controlled control device having at least one processor. In the event of trouble, the input of a trouble code and possibly additional context information takes place into a fault memory of the corresponding control device or into a central fault memory. In each control device, the DTCs are, in each case, set autonomously, independently of the other control devices in the data bus system. Barring systems are partly used so that, in certain conditions of the data bus system, no fault input is written into the corresponding memories of the control devices. This has the purpose of avoiding or at least reducing apparent trouble spots that are difficult to recognize when diagnosing trouble.

Because of the above-mentioned independence of the entered DTCs, faults which spread over the data bus system of a motor vehicle are in each case filed as an independent, equally ranked trouble report (sequence fault) in the control devices. The service technician therefore has to consider all trouble reports or sequence faults and, on this basis, has to take into account several possible causes of trouble in order to detect the actual cause. This requires considerable expenditures and is therefore very time-consuming and costly. A targeted tracing of the fault propagation from one control device to the next control device to finally the unambiguous root cause can hardly be carried out by means of the described concept for the detection of faults in the known data bus system which has a large number of control devices networked via the latter.

In particular, it is an object of the present invention to further develop the known data bus system of a motor vehicle such that the causing component (software and/or hardware) of one or more faults can be found more rapidly.

This object is achieved by providing a data bus system of a motor vehicle having at least a first and a second control device which communicate with one another by way of at least one data bus, wherein (i) the system has at least one identification device which provides an identifier to each of the messages sent by the first and the second control device, (ii) the first control device receives a first message, and the identification device causes the first control device to provide the message sent out by it with a first identifier, and (iii) the second control device receives the message with the first identifier sent out by the first control device, wherein the identification device causes the second control device to provide the message sent therefrom with a second identifier. Advantageous further developments of the invention are described and claimed herein.

Furthermore, the invention describes a method for the program-controlled tracing of a fault, a program-controlled system for the tracing of faults in a vehicle repair shop, and a corresponding system for the tracing of faults in a motor vehicle for the implementation of the method in the data bus system according to the invention.

One aspect of the data bus system of a motor vehicle according to the invention having at least a first and a second control device, which communicate with one another by way of at least one data bus, consists of the fact that the system has at least one identification device. The latter provides the messages sent out by the first and/or the second control device with a respective identifier. By providing the sent-out message in each case with a preferably unambiguous) identifier, the path of the identifier and thus the message provided with the identifier can, in each case, be traced in the data bus system of the motor vehicle. In particular, it can be made visually recognizable which control device has output a message for transmission to the data bus and by which control device this message has been received or further processed.

In the case of the data bus system according to the invention, the first control device receives a first message, and the identification device causes the first control device to provide the messages sent out by it with a first identifier. The second control device receives the message which is sent out by the first control device and which has the first identifier, and the identification device causes the second control device to provide the messages sent out by it with a second identifier.

In an embodiment, it is provided that the first control device receives a message whose identification is new to the first control device and, in this case, the identification device causes the messages sent out by the first control device to be provided with a new first identifier. In an embodiment, it is provided that the second control device recognizes that the new first identifier for the second control device is new and, in this case, the identification device causes the messages sent out by the second control device to be provided with a new second identifier. As a result, a message propagation, which changes after the occurrence of a fault, can be traced more easily or can be compared more easily with the regular message propagation (without the occurrence of a fault) and, as required, can be displayed in a manner that can easily be recognized visually.

In a preferred embodiment, the data bus system according to the invention has at least one fault detection device which detects trouble during the operation of the vehicle and/or during the operation of the control devices of the vehicle. When the fault detection device detects a fault of the control device or of a message which the concerned control device is receiving, for example, the first control device, the fault detection device causes the messages sent by the first control device and placed on the data bus of the vehicle respectively to be provided with a first identifier, in this fault event, with a first fault identification. This identifier or fault identification is new to the second control device which is receiving the message of the first control device, and the identification device causes the output messages placed by the second control device on the data bus to also be provided with an identifier, in this fault event, therefore with a second fault identification.

In a preferred further development of the invention, the fault detection device has an identification memory in which at least the last used identifier and/or at least the identifier of the last processed message is stored. As a result, in the event of a fault, at least the currently received fault identification and the then actually used sent fault identification are recorded in the identification memory.

In a further development of the invention, the first control device is equipped with a first corresponding fault detection device, and the second control device is equipped with a second corresponding fault detection device. Each of the control devices of the data bus system according to the invention is preferably equipped with its own fault detection device.

As a further development of the invention, an identification device is provided in each control device, and/or the identification device generates an identifier in the form a Unique Identifier, such as a Universally Unique Identifier or UUID, or a Globally Unique Identifier, GUID. As a result, an unambiguous assignment is achieved, i.e., it can be unambiguously determined which first control device is the starting point of an outgoing message and by which second control device this outgoing message has been processed. Particularly in the event of a fault, it can then be traced by way of which control devices a fault has propagated that had been detected by a first control device or by a first fault detection device.

In a preferred embodiment, the identifiers are each provided with a time stamp.

In a preferred embodiment of the invention, it is provided that the first and the second control device each have a table, a memory, or the like, in which the received identifiers are recorded. When an identifier stored in the table, etc. is received again instead of an earlier identifier, it is prevented that the identifier used by the corresponding control device changes in its outgoing messages. As an alternative or in addition, it an be detected by a corresponding pattern recognition algorithm running particularly in one or more of the control devices whether a certain identification pattern is repeated periodically. As required, it can be prevented that the identifier used by the corresponding control device is changed. As a result, the expenditures or the loading of the data bus system according to the invention is reduced.

In a further development of the invention, it is provided that the first and the second control device automatically monitors its function for the detection of faults. As a result, the concerned control device and/or the concerned fault detection device can not only recognize whether a received message is faulty, but the concerned control device and/or the concerned fault detection monitors whether its own operation is faulty. As required, it may be provided that the messages sent out by the concerned control device are provided with one of the above-mentioned fault identifications.

In a supplementary fashion, a method is provided for the program-controlled tracing of a fault in a data bus system according to the invention. The data bus system has at least three control devices, which communicate with one another by way of the data bus, and one fault tracing device, which communicates with the control devices, in order to determine whether a message sent out by the first control device and provided with a first fault identification has been processed by the second control device or by the third control device. This preferably takes place by a query of corresponding memories of the three control devices in order to learn the concrete identification of the output messages of the first control device and in order to determine which output message with which identification has been processed by the concerned control device with the occurrence of a fault.

The invention further suggests a program-controlled fault tracing system in a vehicle repair shop as well as a program-controlled fault tracing system in a vehicle which carries out the above-mentioned method for the program-controlled tracing of a fault in a data bus system according to the invention.

Other objects, advantages and novel features of the present invention will become apparent from the following detailed description of one or more preferred embodiments when considered in conjunction with the accompanying drawings.

DETAILED DESCRIPTION OF THE DRAWING

Figure 1:
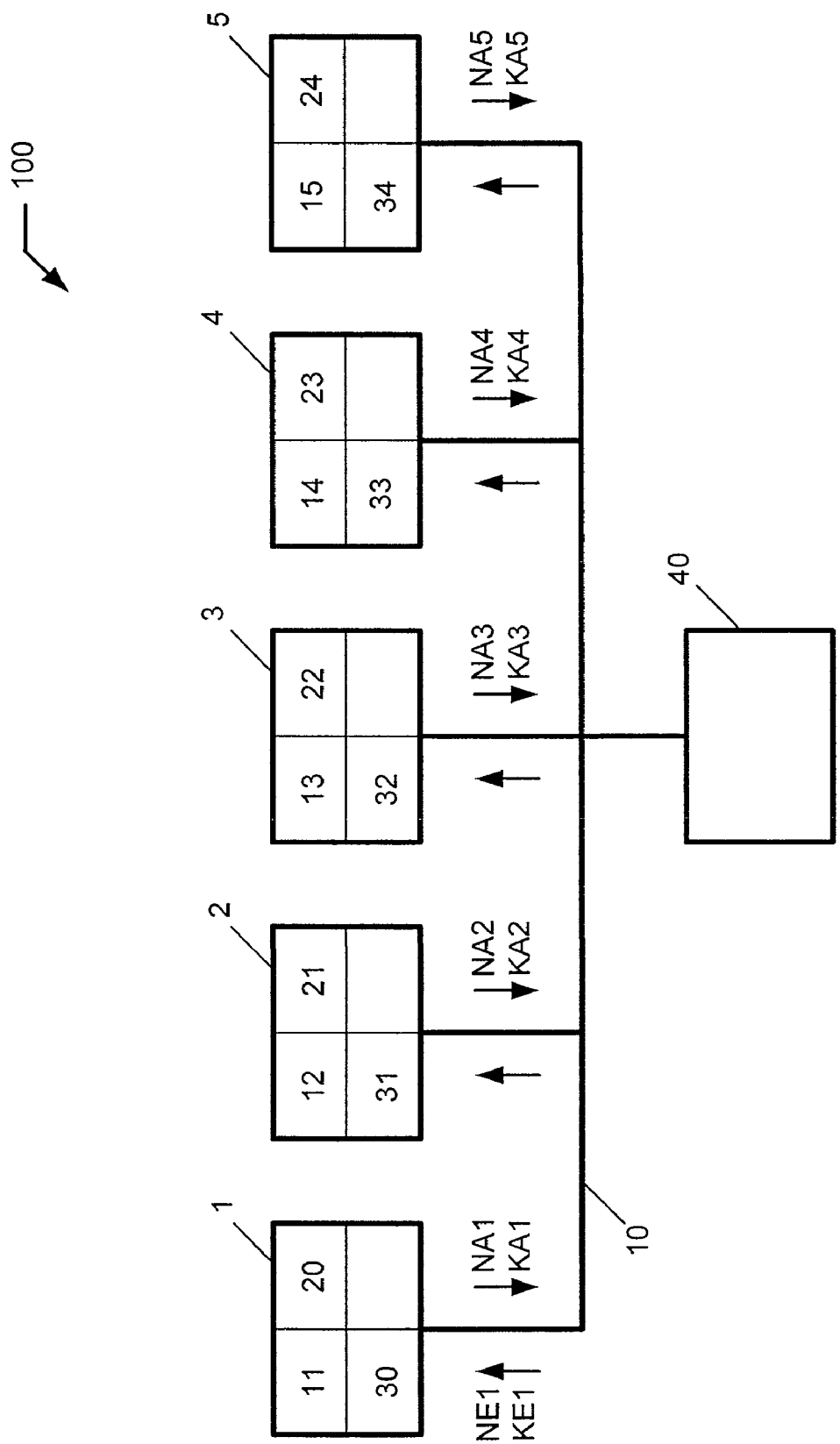
FIG. 1 is a view of a data bus system according to an embodiment of the invention having a plurality of control devices which communicate with one another by way of a data bus.

The data bus system 100 of a motor vehicle (not shown) has program-controlled control devices 1 to 5, which communicate with one another by way of one or more known data buses 10. In this embodiment, each of the control devices according to the invention has its own identification device 11 to 15, its own fault detection device 20 to 24, and a FIFO memory for the received identifiers KE and the sent identifiers KA.

As a rule, the data bus system according to the invention makes it possible to localize the origin of a fault also when this fault is not recognized by a control device or by a fault detection device at the origin of the fault, but can only be recognized by a control device which follows with respect to the communication or a fault detection device which follows. Such a fault may originate, for example, from a software and/or hardware fault of a control device in the data bus system. In order to be able to determine the path of a propagating fault from the origin of the fault beyond one or more control devices to the recognition of the fault or of the fault effect at the recognizing control device or the recognizing fault detection device, it is required to know the communication paths in the data bus system and the respectively participating control devices.

In the meantime, motor vehicles frequently have different equipment variants and therefore different control device variants, so that therefore the data bus systems also vary considerably from one vehicle to the next. This has the result that the communication paths and the participating control devices also very greatly from one vehicle to the next.

In order to be able to determine the communication paths and the participating control devices 1 to 5 of an actual vehicle, the messages NA1 to NA5 sent out by the control devices or placed on the data bus or the data buses 10 are—preferably only temporarily—in each case provided with an identifier KA1 to KA5. In the embodiment here, this takes place by the identification devices 11 to 15. The identifications KA to KA5 differ from one another. The messages NA1 to NA5 are the messages which are usually sent out by the control devices during the regular operation of the vehicle, i.e., in the normal case—in contrast to the fault event.

If, for example, particularly for the further processing by the control device 1, the control device 1 receives a message NA2, which is provided with the identifier KA2 and originates from the control device 2, the identifier KA2 is stored in the memory 30, particularly a FIFO memory. The identification device 11 of the control device 1, in turn, provides the message NA1 sent out or output by the control device 1 with an identifier KA1 which differs from the identifier KA2. The identifier KA1 used by the control device 1 is also stored in the FIFO memory 30 of the control device 1.

If the message NA1 output by the control device 1 is, for example, intended for the control device 3, particularly for the further processing of the message NA1 by the control device 3, then control device 3 receives or processes the message NA1 received from control device 1 and stores the identifier KA1, which it has received, in its FIFO memory 32. The identification device 13 of the control device 3, in turn, provides the messages NA3 output by the control device 3 with an identifier KA3 and stores the identifier KA3 in its FIFO memory 32.

In the same manner, identifiers (KA4 and KA5) are also received and output in the additional control devices 4 and 5 and are stored in the FIFO memories 33 and 34.

According to the invention, the following approach clarifies the question as to by which control device or by which control devices a message output by a first control device and transported by way of the data bus of the vehicle has been processed, further processed, or forwarded. The message, i.e., KA1, output by the first control device has a distinguishable identifier, i.e., KA1. It is stored in the memory 30 of the control device 1 that the identifier KA1 is currently being used for identifying the message outputted by that control device 1. In order to learn the path of the message, it is determined in which memory or memories, i.e., memories 31 to 34, assigned to the additional control device or devices, i.e., control devices 1 to 4, it is recorded or stored that the concerned control device or that the concerned control devices are processing or have processed messages which have the identifier of the message output by the first control device.

In order to largely determine all communication paths in the data bus system 100, during the normal operation of the vehicle, a suitable program-controlled communication path determination system (not shown) queries the memories of the control devices concerning the identifiers received for the processing or forwarding and concerning the identifiers used by the control devices. A comparator device of the program-controlled communication path determination system compares whether the used identifier of the first control device is recorded in the memory of the queried control device as a "processed" identifier. As required, this path is stored by the program-controlled communication path determination system "as taken by the message". After all control devices or their identification memories have been queried in this manner by the program-controlled communication path determination system, largely all communication paths between the control devices will be known. As required, particularly in the case of the searching for a fault in the data bus system according to the invention explained in the following, this information can be utilized particularly for the visual representation of the communication path for a service technician.

As indicated above, this information concerning the communication paths in the normal operation can be utilized particularly when that control device is known that was the first to recognize or report a fault. By means of this information concerning the communication paths of the control devices during the normal operation of the vehicle, the service technician, for example, can determine which additional control devices are disposed in front of this control device (upstream) with respect to the communication and may have caused the first-time fault recognition in the case of the concerned control device without themselves having recognized the cause of a fault.

In the following, it will now be described how it is determined according to the invention which path a message has taken which originates from a control device that has recognized the occurrence of a fault. As mentioned above, this may be a fault in the case of which the concerned control device recognizes that there is something wrong with the message received for further processing or forwarding, and/or that the concerned control device recognizes that its own hardware and/or software is not functioning properly. When, for example, the control device 1 or its fault detection device 20 recognizes a fault, the program-controlled control device 1 causes an identifier KA1, i.e., in the case described here, a fault identification, to be added to the message NA1 sent out by the control device 1, which fault identification is generated by the identification device 11. In addition, it is recorded or stored in the memory 30 which identifier KA1 the control device 1 adds to its outgoing messages. The control device receiving the message NA1 for the further processing and/or evaluation, for example, control device 2, recognizes that an identifier KA1 is added to the message NA1. Since so far the control device 2 has not received any messages with the identifier KA1, the identifier KA1 is new to the control device 2. An identifier or fault identification received for the first time and/or a new received identifier or fault identification causes the identification device 12 of the control device 2 to add its own identifier KA2 to the message output by the control device 2. Correspondingly, the same applies to a communication with the additional control devices 3 and 4, as described above for the case of the adding of identifiers for the determination of the communication paths in the normal operating mode.

In contrast to the above-described adding of identifiers in the normal operation of the vehicle for the determination of the communication paths, in the embodiment of the invention described here, in the event of a fault, the identifiers of the messages received for the processing and of the output messages stored in the memories 30 to 34 of the control devices 1 to 4 are protected against an overwriting in order to be able to later understand the fault propagation in the repair shop or in the vehicle and determine the participating control devices.

In order to be able to determine the participating control devices, particularly in a vehicle repair shop, a fault tracing system 40 is connected with the data bus 10 of the data bus system 100. The system 40 queries the fault identifications in each case recorded in the memories 30 to 34, which are received for the processing and sent, and determines—in the manner described for the normal operation—the path which the identifiers (here, the fault identifications) or which the corresponding messages have taken. The system 40 preferably visually displays the control devices 1 to 5 and the paths from one control device to the next taken in the described manner. In addition, advantageously, the direction of the path is determined and/or displayed, so that a service technician can easily detect which was the first control device to recognize a fault and to cause the providing of all subsequent messages with a fault identification.

In order to make the communication environment of the concerned control devices recognizable, the system also preferably goes back to the above-mentioned information concerning the communication paths between the control devices in the normal operation of the vehicle, or this information is additionally displayed to the service technician on a video screen for localizing the fault, particularly in the communication environment of the first control device that has recognized the fault. As a result, a comparison can therefore also be made between the communication paths in the normal operation of the vehicle and the communication path in the case of the concerned fault, for an easier localization and/or limitation of the fault. Furthermore, the service technician can also be provided with a mode by the system 40, in the case of which mode only the deviations of the communication path from the communication paths of the normal operation as a result of the detected fault are displayed.

As an alternative or in addition, such a fault tracing system (not shown) with or without a video display of the communication paths may also be provided in the vehicle. If such a fault tracing system is provided in the vehicle, it can be provided in the case of predetermined communication path deviations as a result of a fault that the data bus system according to the invention changes into a predetermined operating condition by means of the influence of a corresponding monitoring device provided in the vehicle or in the data bus system. This may, for example, be a so-called fail-safe operating condition so that, in the event of a failure of a hardware and/or software component of the vehicle or of the data bus system, another component will take over its task completely, partially, and/or temporarily.

TABLE OF REFERENCE SYMBOLS

1 to 5 Control device
NE processed message of a control device
KE identifier of the processed message of a control device
NA output message of a control device
KA identifier of the output message of a control device
10 data bus
11 to 15 identification device
20 to 24 fault detection device
30 to 34 FIFO memory of a control device for the received and sent identifiers
40 system for the tracing of faults in a vehicle repair shop or in a vehicle
100 data bus system The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
    a data bus system of the motor vehicle, the data bus system including at least a first and a second control device, the at least first and second control devices communicating with one another over at least one data bus;
    at least one identification device of the data bus system, the identification device providing an identifier to each message sent by the first and the second control device, wherein such identifiers unambiguously identify message paths along the data bus system;
    wherein the first control device receives a first message, and the identification device causes the first control device to provide a message sent therefrom with a first identifier; and
    wherein the second control device receives the message with the first identifier sent from the first control device, the identification device causing the second control device to provide a message sent therefrom with a second identifier.

2. The vehicle according to claim 1, wherein when the first control device receives a message having an identifier that is new to the first control device, the identification device causes the message sent from the first control device to be provided with a new first identifier.

3. The vehicle according to claim 2, wherein when the second control device recognizes that the new first identifier is new to the second control device, the identification device causes the message sent from the second control device to be provided with a new second identifier.

4. The vehicle according to claim 1, further comprising at least one fault detection device, the at least one fault detection device detecting faults during at least one of an operation of the vehicle and an operation of the control devices of the vehicle; and
    wherein the fault detection device comprises an identification memory in which at least one of a last used identifier and an identifier of a last processed message is stored.

5. The vehicle according to claim 4, wherein the first control device is operatively configured with a first fault detection device and the second control device is operatively configured with a second fault detection device.

6. The vehicle according to claim 5, wherein, after detection of a fault, the first fault detection device causes a message sent out by the first control device to be provided with a first fault identification, and
    wherein after the detection of a fault, the second fault detection device causes the message sent out by the second control device to be provided with a second fault identification.

7. The vehicle according to claim 1, wherein the identification device is provided in each of the first and the second control devices.

8. The vehicle according to claim 1, wherein the identification device generates an identifier in the form of a Unique Identifier.

9. The vehicle according to claim 7, wherein the identification device generates an identifier in the form of a Unique Identifier.

10. The vehicle according to claim 9, wherein the Unique Identifier is a Universally Unique Identifier (UUID) or a Globally Unique Identifier (GUID).

11. The vehicle according to claim 1, wherein the identifier includes a time stamp.

12. The vehicle according to claim 1, wherein the first and the second control device each include a memory in which received identifiers are stored, and further wherein when an identifier stored in the memory is received again instead of an earlier identifier, the identifier is prevented from changing.

13. The vehicle according to claim 1, wherein the first and the second control devices independently monitor their respective functioning for fault detection.

14. A method for program-controlled tracing of a fault in a vehicle data bus system, the data bus system comprising at least three control devices which are operably configured to communicate with one another by way of a data bus, the data bus system including an identification device providing an identifier to each of the messages sent out by the three control devices, wherein such identifiers unambiguously identify message paths along the data bus system; the method comprising the acts of:
    receiving a first message in a first of the three control devices;
    sending a message out from the first control device with a first identifier provided by the identification device;
    receiving the message with the first identifier in a second of the three control devices;
    sending a message out from the second control device with a second identifier provided by the identification device; and
    communicating with the control devices by way of a fault tracing device in order to determine whether the message sent out by the first control device and provided with the first identifier as a first fault identification has been processed by one of the second control device or a third of the three control devices.

15. The method according to claim 14, wherein the communication with the control devices via the fault tracing device is carried out in a vehicle repair shop.

16. The method according to claim 15, wherein the communication with the control devices via the fault tracing device is carried out in the vehicle.

* * * * *